United States Patent
Ratasuk et al.

(10) Patent No.: US 11,889,335 B2
(45) Date of Patent: Jan. 30, 2024

(54) DOWNLINK CHANNEL QUALITY REPORT FOR NARROWBAND INTERNET OF THINGS USER EQUIPMENT

(71) Applicant: Nokia Technologies Oy, Espoo (FI)

(72) Inventors: Rapeepat Ratasuk, Inverness, IL (US); Nitin Mangalvedhe, Hoffman Estates, IL (US); David Bhatoolaul, Swindon (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 127 days.

(21) Appl. No.: 17/245,557

(22) Filed: Apr. 30, 2021

(65) Prior Publication Data
US 2022/0353719 A1 Nov. 3, 2022

(51) Int. Cl.
*H04W 24/10* (2009.01)
*H04W 74/08* (2009.01)
*H04W 72/23* (2023.01)

(52) U.S. Cl.
CPC .......... *H04W 24/10* (2013.01); *H04W 72/23* (2023.01); *H04W 74/0833* (2013.01)

(58) Field of Classification Search
CPC .............. H04W 24/10; H04W 72/042; H04W 74/0833
USPC ........................................................ 370/252
See application file for complete search history.

(56) References Cited

U.S. PATENT DOCUMENTS

| | | | |
|---|---|---|---|
| 2020/0187015 A1* | 6/2020 | Li | H04W 16/18 |
| 2022/0140939 A1* | 5/2022 | Sevindik | H04L 1/0026 455/454 |

FOREIGN PATENT DOCUMENTS

| | | | | |
|---|---|---|---|---|
| CN | 112166637 | * | 1/2021 | H04W 72/04 |

OTHER PUBLICATIONS

International Search Report and Written Opinion received for corresponding Patent Cooperation Treaty Application No. PCT/EP2022/058980, dated Jul. 15, 2022, 13 pages.
"Feature lead summary #2 on 104b-e-LTE-Re117_NB_IoT_eMTC-01", 3GPP TSG RAN WG1 Meeting #104b-e, R1-2103954, Agenda: 8.9.1, Moderator (Huawei), Apr. 12-20, 2021, 23 pages.
"Support of 16-QAM for NB-Iot", 3GPP TSG RAN WG1 Meeting #104bis-e, R1-2102652, Agenda: 8.9.1, Nokia, Apr. 12-20, 2021, 7 pages.
"Considerations on support of 16QAM in NB-Iot", 3GPP TSG RAN WG1 Meeting #102-e, R1-2005648, Agenda: 8.9.1, Mediatek, Aug. 17-28, 2020, 7 pages.

(Continued)

*Primary Examiner* — Christopher R Crompton
(74) *Attorney, Agent, or Firm* — SQUIRE PATTON BOGGS (US) LLP

(57) ABSTRACT

Systems, methods, apparatuses, and computer program products for downlink channel quality report for narrowband Internet of things user equipment. The method may include determining one or more of a physical random access channel repetition level or a reference signal received power. The method may also include selecting a channel quality table to use based on one or more of the physical random access channel repetition level or the reference signal received power. The method may further include determining a downlink channel quality report by using the selected channel quality table. In addition, the method may include transmitting the downlink channel quality report to the network element.

20 Claims, 9 Drawing Sheets

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.3.0, Dec. 2020, pp. 1-142.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.3.0, Dec. 2020, pp. 1-1084.
"New WID: Enhancement of Private Network Support for NG-RAN", 3GPP TSG-RAN Meeting #88, RP-201326, Agenda : 9.1, China Telecom, Jun. 29-Jul. 3, 2020, 5 pages.
Indian Application No. 202041012191, Extended Channel Quality Report for 16-Quadrature Amplitude Modulation in Narrowband Internet of Things, 32 pages.
"Corrections to MAC for Rel-16 eMTC", 3GPP TSG-RAN WG2 Meeting #110-e, draftR2-2005826, Ericsson, Jun. 1-12, 2020, 8 pages.

\* cited by examiner

| Codepoint/Index | Value |
|---|---|
| 00 | No RAI information |
| 01 | No subsequent DL and UL data transmission is expected |
| 10 | A single subsequent DL transmission is expected |
| 11 | Reserved |

| Reported value | NPDCCH repetition level |
|---|---|
| noMeasurement | No measurement reporting |
| candidateRep-A | 1 |
| candidateRep-B | 2 |
| candidateRep-C | 4 |
| candidateRep-D | 8 |
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

FIG. 3

| CQI index | modulation | code rate x 1024 | repetition |
|---|---|---|---|
| 0 | out of range | | |
| 1 | QPSK | 56 | 32 |
| 2 | QPSK | 207 | 16 |
| 3 | QPSK | 266 | 4 |
| 4 | QPSK | 195 | 2 |
| 5 | QPSK | 142 | 1 |
| 6 | QPSK | 266 | 1 |
| 7 | QPSK | 453 | 1 |
| 8 | QPSK | 637 | 1 |
| 9 | 16QAM | 423 | 1 |
| 10 | 16QAM | 557 | 1 |
| 11 | 16QAM | 696 | 1 |
| 12 | 16QAM | 845 | 1 |
| 13 | Reserved | | |
| 14 | Reserved | | |
| 15 | Reserved | | |

FIG. 4

| R | Quality Report | Reported Value |
|---|---|---|
| 0 | 0000 | noMeasurement |
| 0 | 0001 | candidateRep-A |
| 0 | 0010 | candidateRep-B |
| 0 | 0011 | candidateRep-C |
| 0 | 0100 | candidateRep-D |
| 0 | 0101 | candidateRep-E |
| 0 | 0110 | candidateRep-F |
| 0 | 0111 | candidateRep-G |
| 0 | 1000 | candidateRep-H |
| 0 | 1001 | candidateRep-I |
| 0 | 1010 | candidateRep-J |
| 0 | 1011 | candidateRep-K |
| 0 | 1100 | candidateRep-L |
| 0 | 1101 | QPSK,CR=266,R=4 |
| 0 | 1110 | QPSK,CR=195,R=2 |
| 0 | 1111 | QPSK,CR=142,R=1 |
| 1 | 0000 | QPSK,CR=266,R=1 |
| 1 | 0001 | QPSK,CR=453,R=1 |
| 1 | 0010 | QPSK,CR=637,R=1 |
| 1 | 0011 | 16-QAM,CR=423,R=1 |
| 1 | 0100 | 16-QAM,CR=557,R=1 |
| 1 | 0101 | 16-QAM,CR=696,R=1 |
| 1 | 0110 | 16-QAM,CR=845,R=1 |

FIG. 5

DOWNLINK CHANNEL QUALITY REPORT FOR NARROWBAND INTERNET OF THINGS USER EQUIPMENT

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for downlink channel quality report for narrowband Internet of things user equipment.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include determining one or more or a physical random access channel repetition level or a reference signal received power. The method may also include selecting a channel quality table to use based on one or more of the physical random access channel repetition level or the reference signal received power. The method may further include determining a downlink channel quality report by using the selected channel quality table. In addition, the method may include transmitting the downlink channel quality report to the network element.

Other example embodiments may be directed to an apparatus. The apparatus may include at least one processor and at least one memory including computer program code. The at least one memory and computer program code may also be configured to, with the at least one processor, cause the apparatus at least to determine one or more of a physical random access channel repetition level or a reference signal received power. The apparatus may also be caused to select a channel quality table to use based on one or more of the physical random access channel repetition level or the reference signal received power. The apparatus may further be caused to determine a downlink channel quality report by using the selected channel quality table. In addition, the apparatus may be caused to transmit the downlink channel quality report to the network element.

Other example embodiments may be directed to an apparatus. The apparatus may include means for measuring, at the apparatus, a radio altimeter signal. The apparatus may also include means for determining one or more or a physical random access channel repetition level or a reference signal received power. The apparatus may also include means for selecting a channel quality table to use based on one or more of the physical random access channel repetition level or the reference signal received power. The apparatus may further include means for determining a downlink channel quality report by using the selected channel quality table. In addition, the apparatus may include means for transmitting the downlink channel quality report to the network element.

In accordance with other example embodiments, a non-transitory computer readable medium may be encoded with instructions that may, when executed in hardware, perform a method. The method may include determining one or more or a physical random access channel repetition level or a reference signal received power. The method may also include selecting a channel quality table to use based on one or more of the physical random access channel repetition level or the reference signal received power. The method may further include determining a downlink channel quality report by using the selected channel quality table. In addition, the method may include transmitting the downlink channel quality report to the network element.

Other example embodiments may be directed to a computer program product that performs a method. The method may include measuring, at a network node, a radio altimeter signal. The method may also include determining one or more or a physical random access channel repetition level or a reference signal received power. The method may also include selecting a channel quality table to use based on one or more of the physical random access channel repetition level or the reference signal received power. The method may further include determining a downlink channel quality report by using the selected channel quality table. In addition, the method may include transmitting the downlink channel quality report to the network element.

Other example embodiments may be directed to an apparatus that may include circuitry configured to measure, at the apparatus, a radio altimeter signal. The apparatus may also include circuitry configured to determine one or more of a physical random access channel repetition level or a reference signal received power. The apparatus may also include circuitry configured to select a channel quality table to use based on one or more of the physical random access channel repetition level or the reference signal received power. The apparatus may further include circuitry configured to determine a downlink channel quality report by using the selected channel quality table. In addition, the apparatus may include circuitry configured to transmit the downlink channel quality report to the network element.

Certain example embodiments may be directed to a method. The method may include transmitting, to a user equipment, a system information block including a mapping between a channel quality table and a physical random access channel repetition level. The method may also include receiving, from the user equipment, a downlink channel quality report based on a selected channel quality table.

Other example embodiments may be directed to an apparatus. The apparatus may include at least one processor and at least one memory including computer program code. The at least one memory and computer program code may be configured to, with the at least one processor, cause the apparatus at least to transmit, to a user equipment, a system information block including a mapping between a channel quality table and a physical random access channel repetition level. The apparatus may also be caused to receive, from the user equipment, a downlink channel quality report based on a selected channel quality table.

Other example embodiments may be directed to an apparatus. The apparatus may include means for transmitting, to a user equipment, a system information block comprising a mapping between a channel quality table and a physical random access channel repetition level. The apparatus may also include means for receiving, from the user equipment a downlink channel quality report based on a selected channel quality table.

In accordance with other example embodiments, a non-transitory computer readable medium may be encoded with instructions that may, when executed in hardware, perform a method. The method may include transmitting, to a user equipment, a system information block including a mapping between a channel quality table and a physical random access channel repetition level. The method may also include receiving, from the user equipment, a downlink channel quality report based on a selected channel quality table.

Other example embodiments may be directed to a computer program product that performs a method. The method may include transmitting, to a user equipment, a system information block including a mapping between a channel quality table and a physical random access channel repetition level. The method may also include receiving, from the user equipment, a downlink channel quality report based on a selected channel quality table.

Other example embodiments may be directed to an apparatus that may include circuitry configured to transmit, to a user equipment, a system information block including a mapping between a channel quality table and a physical random access channel repetition level. The apparatus may also include circuitry configured to receive, from the user equipment, a downlink channel quality report based on a selected channel quality table.

BRIEF DESCRIPTION OF THE DRAWINGS

For proper understanding of example embodiments, reference should be made to the accompanying drawings, wherein:

FIG. 3 illustrates an example downlink channel quality report for narrowband Internet of things.

FIG. 4 illustrates an example channel quality indicator narrowband physical downlink sharing channel narrowband table, according to certain example embodiments.

FIG. 5 illustrates a DCQR table extension using a reserved bit, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for downlink channel quality report (DCQR), for instance, for narrowband Internet of things (NB-IoT) user equipment (UE) configured with or supporting 16-quadrature amplitude modulation (16-QAM).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

$3^{rd}$ Generation Partnership Project (3GPP) Rel-17 discusses IoT enhancements with an objective to specify 16-QAM support for NB-IoT. For instance, 3GPP species 16-QAM for unicast in uplink (UL) and downlink (DL), including changes to DL power allocation for narrowband physical downlink sharing channel (NPDSCH) and DL transport block size (TBS). This was specified without a new NB-IoT UE capability. For DL, increase in maximum TBS of, for example, twice the Rel-16 maximum, and soft buffer size may be specified by modifying at least existing category NB2. For UL, the maximum TBS may not be increased. Additionally, the NB-IoT channel quality reporting may be extended based on the framework of Rel-14-16, to support 16-QAM in DL.

Figures 1, 2:
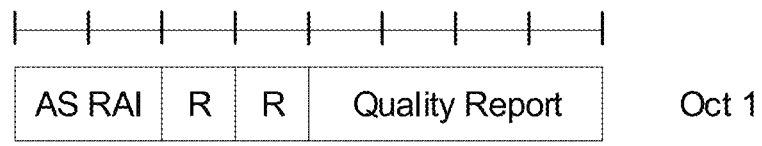
FIG. 1 illustrates an example downlink channel quality report (DCQR) and access stratum release assistance indication (AS RAI) medium access control (MAC) control element.
FIG. 2 illustrates example values for an AS RAI.

3GPP also describes DCQR and access stratum (AS) release assistance indication (RAI) medium access control (MAC) control element (CE). For example, DCQR and AS RAI MAC CE may be identified by a MAC protocol data unit (PDU) sub-header with logical channel ID (LCID). FIG. 1 illustrates an example DCQR and AS RAI MAC CE. A MAC PDU may include at most one DCQR and AS RAI MAC CE. Additionally, the DCQR and AS RAI MAC CE may have a fixed size and include a single octet as shown in FIG. 1. For example, the single octet may be defined with a reserved bit ("R") set to "0", and an AS RAI field as shown in FIG. 2, which illustrates example values for AS RAI. The single octet may also be defined with a quality report for an NB-IoT UE. The quality report (QR) field may correspond to a channel quality indicator-narrowband physical downlink control channel-narrowband (CQI-NPDCCH-NB). For a bandwidth reduced low complexity (BL) eMTC UE or eMTC UE in coverage enhancement (CE), the quality report field may correspond to DL channel quality report, and the length of the field may be 4 bits. Furthermore, the CQI-NPDCCH-NB may be defined by FIG. 3, which illustrates an example DCQR for NB-IoT. As shown in FIG. 3, the CQI-NPDCCH-NB report may provide the number of NPDCCH repetitions needed to achieve 1% block error ratio (BLER) on the NPDCCH.

In pre-Rel-17 NB-IoT specifications, channel quality report may be provided in Msg3 during initial access and in MAC CE for the UE in radio resource control (RRC) CONNECTED state. However, the reporting may be based on the number of repetitions needed to achieve 1% BLER for the NPDCCH as shown in FIG. 3. For a UE configured with 16-QAM, the table in FIG. 3 may not be sufficient since the best value only signifies that the UE does not require repetition for the NPDCCH. Thus, there would be no way for the eNB to select the appropriate MCS level based on the existing NB-IoT DCQR definition.

In view of certain existing problems, one option to address these problems may be to define a new table for the UE configured with 16-QAM with appropriate MCS levels (e.g., similar to eMTC CQI table). There may, however, be certain issues with this approach. For example, for transmission of Msg3, the network may not know if the UE is capable of 16-QAM modulation, and therefore the eNB may not know which table the UE is using. Additionally, it may be desirable that support be provided for all existing DCQR values even when the UE is configured with 16-QAM. In doing so, it may be possible to prevent the need for RRC configuration messages as radio conditions at the UE changes. In view of the above, certain example embodiments may provide a method to extend the NB-IoT channel quality reporting based on the existing specification framework to support 16-QAM modulation in the DL.

According to certain example embodiments, another DCQR table may be defined in addition to the CQI-NPDCCH-NB-r14 table (see, for example, FIG. 3). For instance, the table may be based on NPDSCH performance instead of NPDCCH performance. FIG. 4 illustrates an example CQI-NPDSCH-NB-r17 table (4 bits), according to certain example embodiments. As illustrated in FIG. 4, the CSI reference resource may be defined based on narrowband reference signal (NRS) availability.

In certain example embodiments, for a UE that supports 16-QAM capability, the reserved bit in the DCQR MAC CE or a spare bit in Msg3 may be used to indicate which table the UE is reporting. For instance, in certain example embodiments, the reserved bit value of 0 equals CQI-NPDCCH-NB-r14, and reserved bit value of 1 equals CQI-NPDSCH-NB-r17. In other example embodiments, the indication using the spare or reserved bit may be used only for DCQR report in Msg3. For instance, when the DCQR report is in RRC CONNECTED MODE, the UE may be configured with the table to use and hence use of the reserved bit may not be necessary. In some example embodiments, the reversed configuration (i.e., to use reserved bit only in CONNECTED MODE) may also be supported. Thus, in certain example embodiments, it may be possible for the reserved bit to be available for other uses.

According to certain example embodiments, for a UE that is in RRC CONNECTED MODE and configured with 16-QAM, for MAC CE reporting, the use of the reserved bit may be dependent on the release assistance indication (RAI) content. For example, if the RAI is set to "01—no subsequent DL and UL data transmission is expected," then the CQI-NPDCCH-NB-r14 table may be used without requiring an indication using the reserved bit. In this manner, it may be possible to reuse the reserved bit for another purpose including, for example, overbooking of the reserved bit.

In certain example embodiments, for a UE that is in RRC CONNECTED MODE and configured with 16-QAM, the eNB may make a request to the UE of what kind of DCQR report the eNB wants (i.e., NPDCCH vs NPDSCH report). In some example embodiments, this information may be conveyed in the DCQR MAC CE request message. Alternatively, in other example embodiments, the DCQR table may be extended using the reserved/spare bit (R) as shown in FIG. 5. Specifically, FIG. 5 illustrates a DCQR table extension using a reserved bit, according to certain example embodiments. In these example embodiments, the DCQR value is obtained from combining the value of reserved/spare bit (R) with the values of the CQI-NPDCCH-NB-r14 bits.

According to certain example embodiments, a table extension may include three new values for Msg3 (i.e., no need to use reserved bit). Then, for RRC CONNECTED MODE, the UE may select between two tables (legacy table or CQI-NPDCCH-NB-r14 table, and extended table or CQI-NPDSCH-NB-r17 table). In certain example embodiments, the extended table or CQI-NPDCCH-NB-r14 table may include the legacy table and one or more new fields, and in other example embodiments, the extended table may correspond to a new table. According to some example embodiments, the selection between two tables may be based on the narrowband reference signal received power (NRSRP) or other measurements or measurement reports (for example, narrowband reference signal received quality, signal to noise ratio, power headroom report, and/or the like). For instance, according to certain example embodiments, if the UE reports NRSRP is less than a threshold, then the UE may use the CQI-NPDCCH-NB-r14 table. Otherwise, the UE may use the CQI-NPDSCH-NB-r17 table.

In certain example embodiments, the UE may decide which table to use based on the NRSRP or alternatively which NB-IoT physical random access channel (NPRACH) configuration the UE is using. Alternatively, in other example embodiments, the UE may decide which table to use based on both the NRSRP and the NPRACH. For instance, in some example embodiments, if the UE is using NPRACH repetition level 0 and the associated NPRACH resource, then it may select between the CQI-NPDCCH-NB-r14 table or the CQI-NPDSCH-NB-r17 table (or just use the CQI-NPDSCH-NB-r17 table). Otherwise, if NPRACH repetition level 1 or 2 and the associated NPRACH resource is used, then the CQI-NPDCCH-NB-r14 table may be available. According to certain example embodiments, selecting between the two tables may be configurable by the eNB (i.e., which table may be available for which NPRACH configuration). In certain example embodiments, up to three NPRACH resources can be configured per carrier, and each NPRACH resource is associated with a different number of NPRACH repetitions or repetition levels. According to some example embodiments, having one table may reduce potential measurements by the UE (e.g., CQI-NPDCCH-NB-r14 table may be for NPDCCH, while a second table may be for NPDSCH.

According to certain example embodiments, for channel quality reporting after Msg3, the UE may be configured to use either the CQI-NPDCCH-NB-r14 table or the CQI-NPDSCH-NB-r17 table. In some example embodiments, this configuration may be based on the reported NRSRP. According to other example embodiments, the UE may be configured with semi-persistent scheduling for periodic DCQR MAC CE reporting from the UE.

Figure 6A:
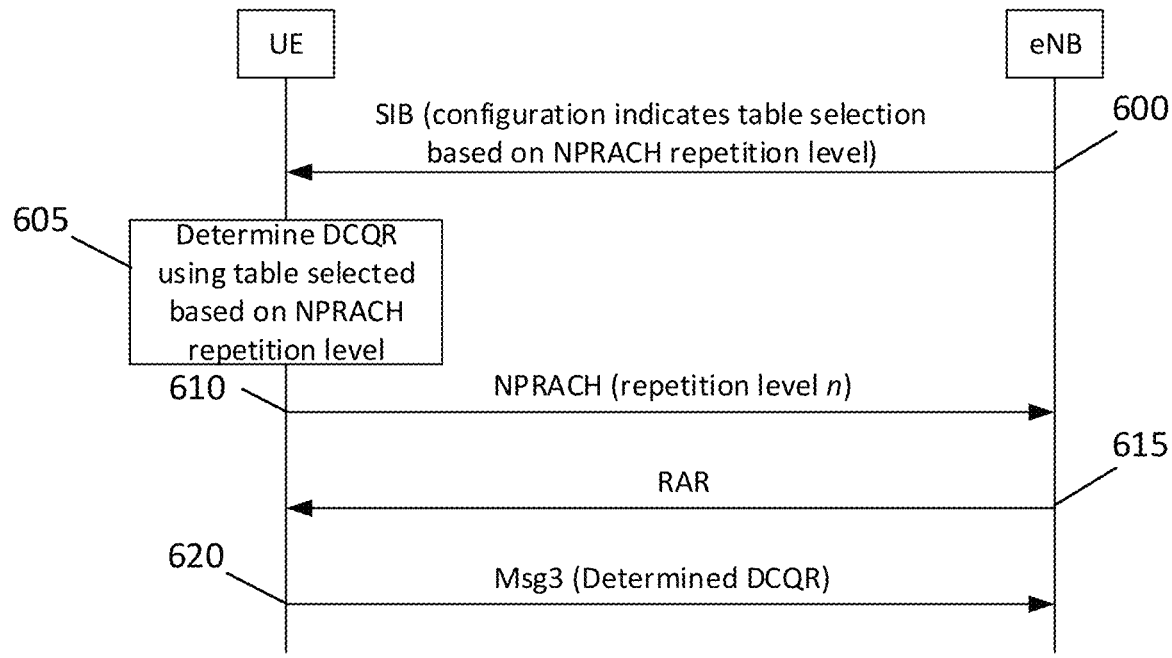
FIG. 6(A) illustrates an example signal flow diagram, according to certain example embodiments.

FIG. 6(A) illustrates an example signal flow diagram, according to certain example embodiments. At 600, the UE may receive a system information block (SIB) containing information on a channel quality table selection based on a NPRACH repetition level. At 605, the UE may determine the NPRACH repetition level n (0, 1, or 2) and correspondingly, the channel quality table. In addition, the UE may determine the DCQR value to report based on the determined channel quality table. At 610, the UE may transmit the NPRACH using repetition level n. At 615, the UE may receive a random access response (RAR) with an UL grant for Msg3. At 620, the UE may transmit the DCQR for 16-QAM based on the table selection.

Figure 6B:
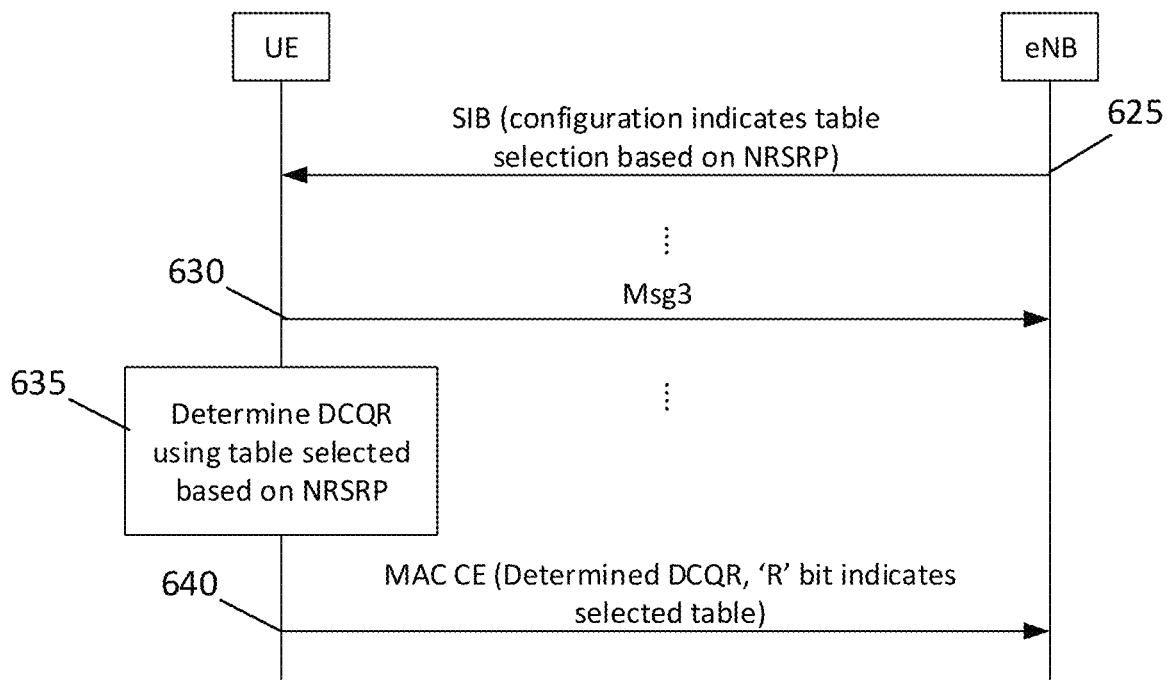
FIG. 6(B) illustrates another example signal flow diagram, according to certain example embodiments.

FIG. 6(B) illustrates another example signal flow diagram, according to certain example embodiments. At 625, the UE may receive a SIB containing information on a channel quality table selection based on a NRSRP. At 630, the UE may transmit the DCQR for 16-QAM based on the table selection. At 635, for DCQR indication after Msg3, the UE may determine which table to use based on the NRSRP. At 640, the UE may transmit the MAC CE for the DCQR where the reserved bit indicates the selected table together with the quality report field provides the DCQR value.

Figure 6C:
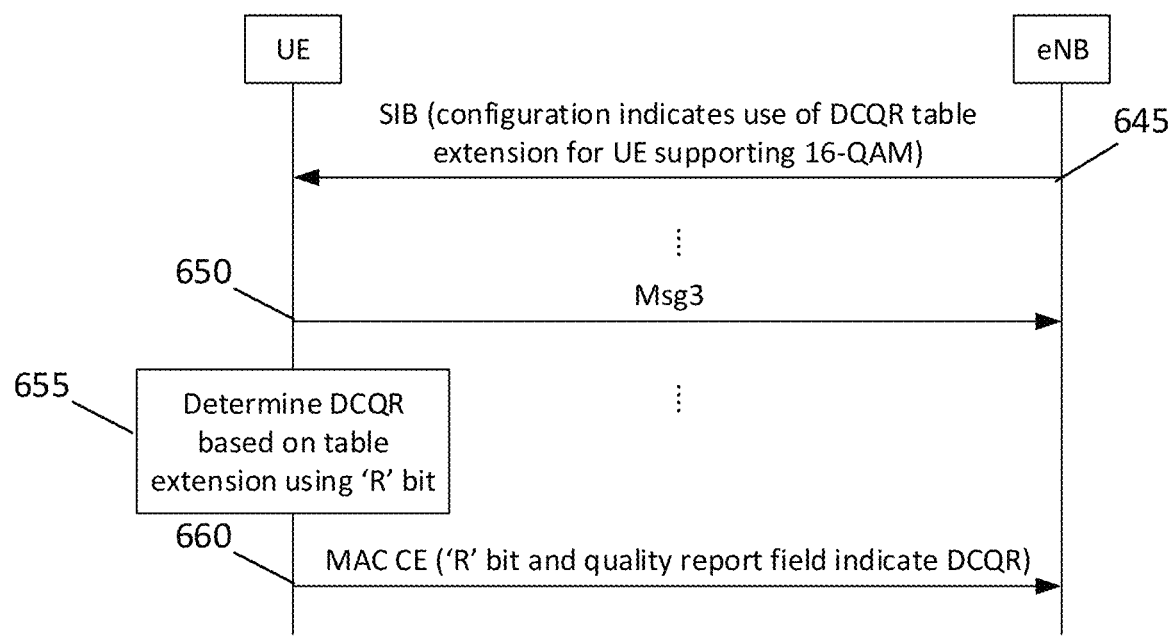
FIG. 6(C) illustrates yet another example signal flow diagram, according to certain example embodiments.

FIG. 6(C) illustrates yet another example signal flow diagram, according to certain example embodiments. At 645, the UE may receive a SIB containing information on using the DCQR table extension for the UE supporting 16-QAM. At 650, the UE may transmit the DCQR based on the table extension for 16-QAM. At 655, for DCQR indication after Msg3, the UE may determine the DCQR based on the table extension. According to certain example embodiments, the UE may encode the values for the quality report field and the reserved bit in the MAC CE to provide the DCQR value based on the table extension. At 660, the UE may transmit the MAC CE for the DCQR where the reserved bit together with the quality report provides the DCQR value.

Figure 7:
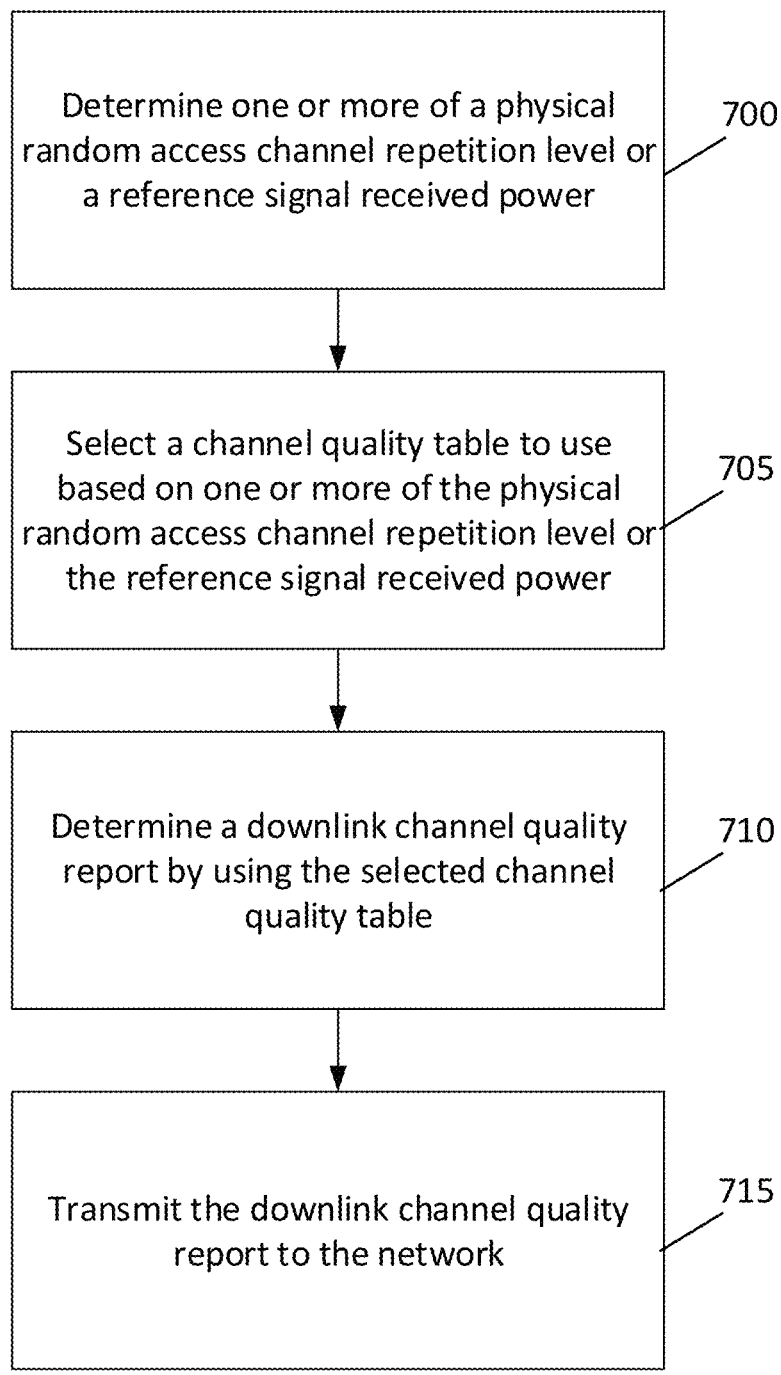
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a UE, for instance, similar to apparatus 10 illustrated in FIG. 9(a).

According to certain example embodiments, the method of FIG. 4 may include, at 700, determine one or more of a physical random access channel repetition level or a reference signal received power. At 705, the method may include selecting a channel quality table based on one or more of the physical random access channel repetition level or the reference signal received power. At 710, the method may include determining a downlink channel quality report by using the selected channel quality table. At 715, the method may include transmitting the downlink channel quality report to the network element.

According to certain example embodiments, the determination of one or more of the physical random access channel repetition level or the reference signal received power may include receiving, from a network element, a system information block. According to other example embodiments, the downlink channel quality report may correspond to the physical random access channel repetition level being used by the apparatus. According to other example embodiments, the method may also include encoding values for a quality report field and a reserved bit in a medium access control control element based on the selected channel quality table. According to further example embodiments, the method may further include transmitting the medium access control control element for the downlink channel quality report. In some example embodiments, the reserved bit together with the quality report field may indicate the downlink channel quality report. In certain example embodiments, use of the reserved bit may be dependent on a release assistance indication content. In other example embodiments, the downlink channel quality report may include a narrowband physical downlink control channel report or a narrowband physical downlink sharing channel report. In some example embodiments, the determination of the channel quality table to use may be based on a narrowband reference signal received power, a measurement report, or a narrowband Internet of things narrowband physical random access channel configuration that a user equipment is using.

Figure 8:
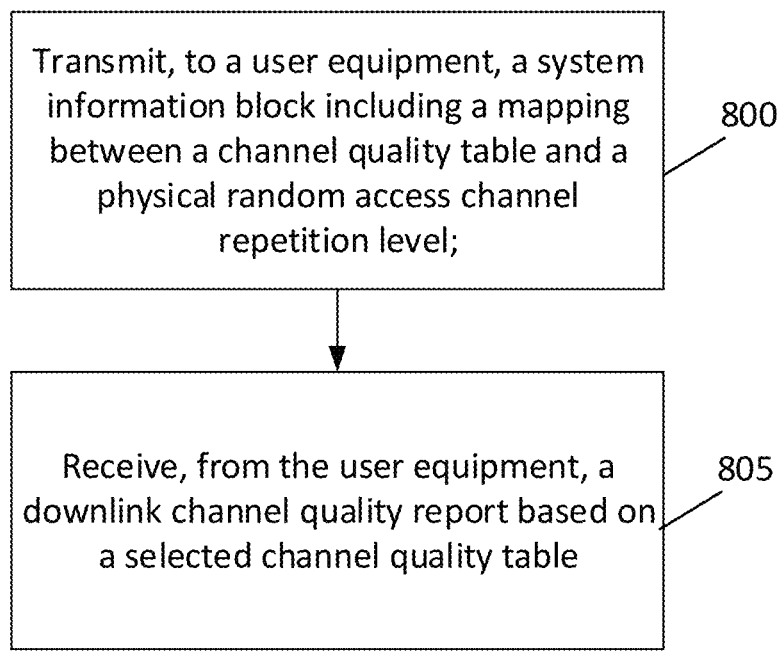
FIG. 8 an example flow diagram of another method, according to certain example embodiments.

FIG. 8 illustrates an example flow diagram of another method, according to certain example embodiments. In an example embodiment, the method of FIG. 8 may be performed by a network entity, network node, or a group of multiple network elements in a 3GPP system, such as LTE or 5G-NR. For instance, in an example embodiment, the method of FIG. 8 may be performed by a base station or gNB, for instance, similar to apparatus 20 illustrated in FIG. 9(b).

According to certain example embodiments, the method of FIG. 5 may include, at 800, transmitting, to a user equipment, a system information block including a mapping between a channel quality table and a physical random access channel repetition level. At 805, the method may include receiving, from the user equipment, a downlink channel quality report based on a selected channel quality table.

According to certain example embodiments, the received downlink channel quality report corresponds to a narrowband physical random access channel repetition level being used by the user equipment. According to other example embodiments, the downlink channel quality report may be received in a medium access control control element including values for a quality report field and a reserved bit. According to some example embodiments, the reserved bit together with the quality report field may indicate the downlink channel quality report. In certain example embodiments, the method may also include transmitting a request to the user equipment requesting a desired type of downlink channel quality report. In other example embodiments, the desired type of downlink channel quality report may include a narrowband physical downlink control channel report or a narrowband physical downlink sharing channel report. In some example embodiments, the method may further include transmitting a re-authorization-request with an uplink grant to the user equipment. According to certain example embodiments, the method may also include configuring the user equipment to select the channel quality table based on a narrowband Internet of things physical random access channel.

Figure 9A:
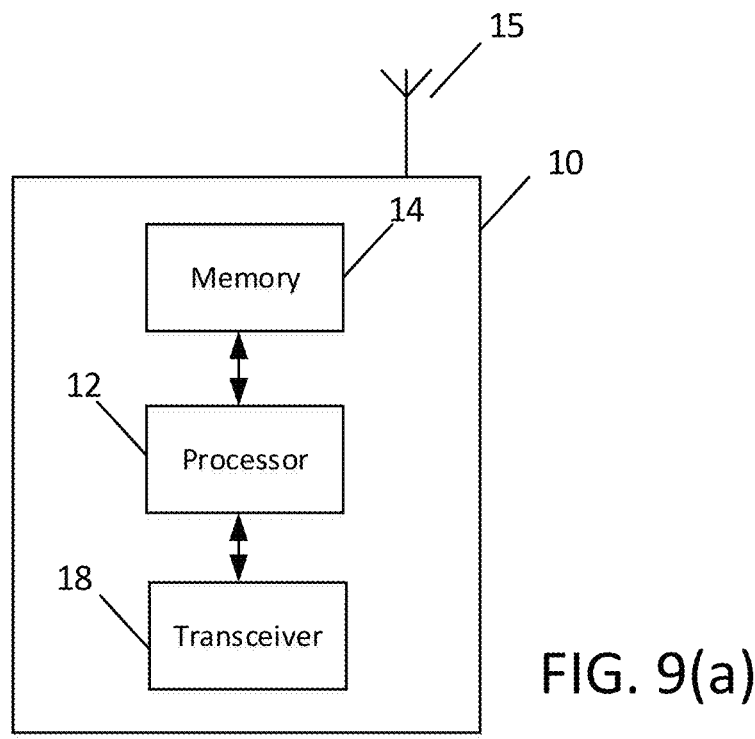
FIG. 9(a) illustrates an apparatus, according to certain example embodiments.
Figure 9B:
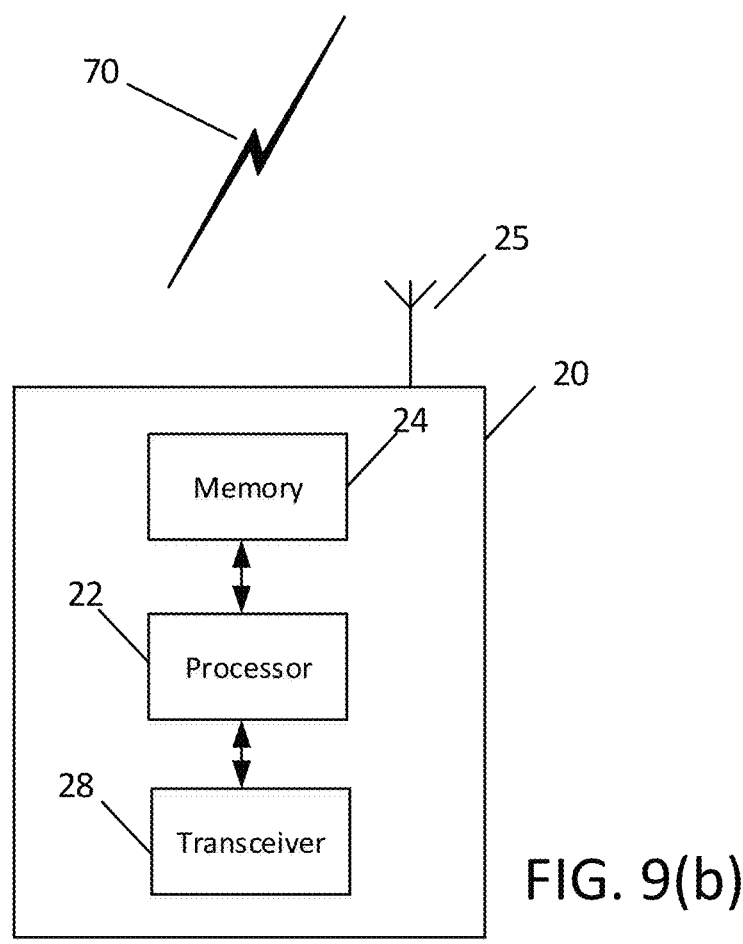
FIG. 9(b) illustrates another apparatus, according to certain example embodiments.

FIG. 9(a) illustrates an apparatus 10 according to certain example embodiments. In certain example embodiments, apparatus 10 may be a node or element in a communications network or associated with such a network, such as a UE (e.g., reference UE or target UE), mobile equipment (ME), mobile station, mobile device, stationary device, or other device. It should be noted that one of ordinary skill in the art would understand that apparatus 10 may include components or features not shown in FIG. 9(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(*a*).

As illustrated in the example of FIG. 9(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to determine one or more of a physical random access channel repetition level or a reference signal received power. Apparatus 10 may also be controlled by memory 14 and processor 12 to select a channel quality table to use based on one or more of the physical random access channel repetition level or the reference signal received power. Apparatus 10 may further be controlled by memory 14 and processor 12 to determine a downlink channel quality report by using the selected channel quality table. In addition, apparatus 10 may be controlled by memory 14 and processor 12 to transmit the downlink channel quality report to the network element.

FIG. 9(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, BS, and/or WLAN access point, associated with a radio access network (RAN), such as an LTE network, 5G or NR. It should be noted that one of ordinary skill in the art would understand that apparatus 20 may include components or features not shown in FIG. 9(*b*).

As illustrated in the example of FIG. 9(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to transmit, to a user equipment, a system information block including a mapping between a channel quality table and a physical random access channel repetition level. Apparatus 20 may also be controlled by memory 24 and processor 22 to receive, from the user equipment, a downlink channel quality report based on a selected channel quality table.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations Certain example embodiments may be directed to an apparatus that includes means for performing any of the methods described herein including, for example, means for determining one or more of a physical random access channel repetition level or a reference signal received power. The apparatus may also include means for selecting a channel quality table to use based on one or more of the physical random access channel repetition level or the reference signal received power. The apparatus may further include means for determining a downlink channel quality report by using the selected channel quality table. In addition, the apparatus may include means for transmitting the downlink channel quality report to the network element.

Other example embodiments may be directed to an apparatus that includes means for transmitting, to a user equipment, a system information block including a mapping between a channel quality table and a physical random access channel repetition level. The apparatus may also include means for receiving, from the user equipment, a downlink channel quality report based on a selected channel quality table.

Certain example embodiments described herein provide several technical improvements, enhancements, and/or advantages. In some example embodiments, it may be possible to allow the existing DCQR reports (either in Msg3 or MAC CE) to be re-used to support reporting for both NPDCCH and NPDSCH. According to other example embodiments, the UE may be able to indicate whether it is using an existing table or a new table, thus preserving all legacy values. Furthermore, in some example embodiments, different reporting may be supported for Msg3 and for UE in RRC CONNECTED status.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BS Base Station
CE Coverage Enhanced
DCI Downlink control Information
DL Downlink
eNB Enhanced Node B
gNB 5G or Next Generation NodeB
LSB Least Significant Bit
LTE Long Term Evolution
MAC Medium Access Control
MAC CE MAC Control Element
MSB Most Significant Bit
MTC Machine Type Communication
NB-IoT Narrowband Internet of Things
NPDCCH Narrowband PDCCH
NPDSCH Narrowband PDSCH
NR New Radio
PRB Physical Resource Block
PDCCH Physical Downlink Control Channel
PDSCH Physical Downlink Sharing Channel
RRC Radio Resource Control
RSRP Reference Signals Received Power
SIB System Information Block
UE User Equipment
UL Uplink

We claim:

1. An apparatus, comprising:
at least one processor; and
at least one memory comprising computer program code,
the at least one memory and the computer program code are configured, with the at least one processor, to cause the apparatus at least to
receive, from a network element a system information block, wherein the system information block comprises a mapping between a channel quality table and a physical random access channel repetition level;

determine one or more of the physical random access channel repetition level or a reference signal received power;

select the channel quality table to use based on one or more of the physical random access channel repetition level or the reference signal received power;

determine a downlink channel quality report by using the selected channel quality table; and transmit the downlink channel quality report to the network element.

2. The apparatus according to claim 1, wherein the downlink channel quality report corresponds to the physical random access channel repetition level being used by the apparatus.

3. The apparatus according to claim 1, wherein the at least one memory and the computer program code are further configured, with the at least one processor, to cause the apparatus at least to:

encode values for a quality report field and a reserved bit in a medium access control control element based on the selected channel quality table.

4. The apparatus according to claim 3, wherein the at least one memory and the computer program code are further configured, with the at least one processor, to cause the apparatus at least to:

transmit the medium access control control element for the downlink channel quality report, wherein the reserved bit together with the quality report field indicates the downlink channel quality report.

5. The apparatus according to claim 3, wherein use of the reserved bit is dependent on a release assistance indication content.

6. The apparatus according to claim 1, wherein the downlink channel quality report comprises a narrowband physical downlink control channel report or a narrowband physical downlink sharing channel report.

7. The apparatus according to claim 1, wherein the determination of which channel quality table to use is based on a narrowband reference signal received power, a measurement report, or a narrowband Internet of things narrowband physical random access channel configuration that the apparatus is using.

8. An apparatus, comprising:
at least one processor; and
at least one memory comprising computer program code, the at least one memory and the computer program code are configured, with the at least one processor, to cause the apparatus at least to transmit, to a user equipment, a system information block comprising a mapping between a channel quality table and a physical random access channel repetition level; and receive, from the user equipment, a downlink channel quality report based on a selected channel quality table.

9. The apparatus according to claim 8, wherein the received downlink channel quality report corresponds to a narrowband physical random access channel repetition level being used by the user equipment.

10. The apparatus according to claim 8,
wherein the downlink channel quality report is received in a medium access control control element comprising values for a quality report field and a reserved bit, and wherein the reserved bit together with the quality report field indicates the downlink channel quality report.

11. The apparatus according to claim 8, wherein the at least one memory and the computer program code are further configured, with the at least one processor, to cause the apparatus at least to:

transmit a request to the user equipment requesting a desired type of downlink channel quality report, wherein the desired type of downlink channel quality report comprises a narrowband physical downlink control channel report or a narrowband physical downlink sharing channel report.

12. The apparatus according to claim 8, wherein the at least one memory and the computer program code are further configured, with the at least one processor, to cause the apparatus at least to:

transmit a re-authorization-request with an uplink grant to the user equipment.

13. The apparatus according to claim 8, wherein the at least one memory and the computer program code are further configured, with the at least one processor, to cause the apparatus at least to:

configure the user equipment to select the channel quality table based on a narrowband Internet of things physical random access channel.

14. A method, comprising:
receiving, from a network element, a system information block, wherein the system information block comprises a mapping between a channel quality table and a physical random access channel repetition level;

determining one or more or the physical random access channel repetition level or a reference signal received power;

selecting the channel quality table to use based on one or more of the physical random access channel repetition level or the reference signal received power;

determining a downlink channel quality report by using the selected channel quality table; and transmitting the downlink channel quality report to the network element.

15. The method according to claim 14, wherein the downlink channel quality report corresponds to the physical random access channel repetition level being used by the apparatus.

16. The method according to claim 14, further comprising:

encoding values for a quality report field and a reserved bit in a medium access control control element based on the selected channel quality table.

17. The method according to claim 16, further comprising:

transmitting the medium access control control element for the downlink channel quality report, wherein the reserved bit together with the quality report field indicates the downlink channel quality report.

18. The method according to claim 16, wherein use of the reserved bit is dependent on a release assistance indication content.

19. The method according to claim 14, wherein the downlink channel quality report comprises a narrowband physical downlink control channel report or a narrowband physical downlink sharing channel report.

20. The method according to claim 14, wherein the determination of the channel quality table to use is based on a reference signal received power, a measurement report, or a narrowband Internet of things physical random access channel configuration that a user equipment is using.

* * * * *